United States Patent
Malloy et al.

(10) Patent No.: US 8,095,649 B2
(45) Date of Patent: Jan. 10, 2012

(54) NETWORK DELAY ANALYSIS INCLUDING PARALLEL DELAY EFFECTS

(75) Inventors: Patrick J Malloy, Washington, DC (US); Alain J Cohen, McLean, VA (US); Steven Niemczyk, San Francisco, CA (US); Russell Mark Elsner, Bethesda, MD (US)

(73) Assignee: OPNET Technologies, Inc., Bethesda, MD (US)

( * ) Notice: Subject to any disclaimer, the term of this patent is extended or adjusted under 35 U.S.C. 154(b) by 519 days.

(21) Appl. No.: 12/060,271

(22) Filed: Apr. 1, 2008

(65) Prior Publication Data
US 2008/0281961 A1 Nov. 13, 2008

Related U.S. Application Data

(60) Provisional application No. 60/916,842, filed on May 9, 2007.

(51) Int. Cl.
*G06F 15/16* (2006.01)
(52) U.S. Cl. .................... 709/224; 370/395.21; 370/238
(58) Field of Classification Search .................. 709/224, 709/232; 370/395.21, 238
See application file for complete search history.

(56) References Cited

U.S. PATENT DOCUMENTS

| | | | |
|---|---|---|---|
| 6,393,480 B1 | 5/2002 | Qin et al. | |
| 6,665,716 B1* | 12/2003 | Hirata et al. | 709/224 |
| 7,130,915 B1* | 10/2006 | Rustad | 709/232 |
| 7,133,911 B1 | 11/2006 | Schaffer et al. | |
| 7,401,141 B2* | 7/2008 | Carusi et al. | 709/224 |
| 7,624,178 B2* | 11/2009 | Tevis | 709/224 |
| 2008/0181118 A1* | 7/2008 | Sharma et al. | 370/238 |

* cited by examiner

*Primary Examiner* — Jungwon Chang

(57) ABSTRACT

A multi-functional graphical user interface facilitates the analysis and assessment of application delays, including delays that occur on multiple paths. A trace file of an application's network events is processed to categorize the causes of delays incurred in the propagation and processing of these events. The system identifies the amount of delay ('component delay') that can be eliminated by eliminating each of the components of delay individually, as well as the amount of delay ('parallel delay') that can be eliminated by eliminating combinations of the delay components. A user interface displays the amount of reduction that can be achieved by eliminating each component delay individually and the amount of reduction that can be achieved by eliminating combinations of the individual component delays. To facilitate the analysis and assessment of these potential reductions, the interface allows the user to 'drill down' to view the individual delay components contained in each combination forming the parallel delays. In this manner, the user is provided a view of each of the delay components that would need to be addressed, either individually or in combination, to improve the overall application delay.

30 Claims, 3 Drawing Sheets

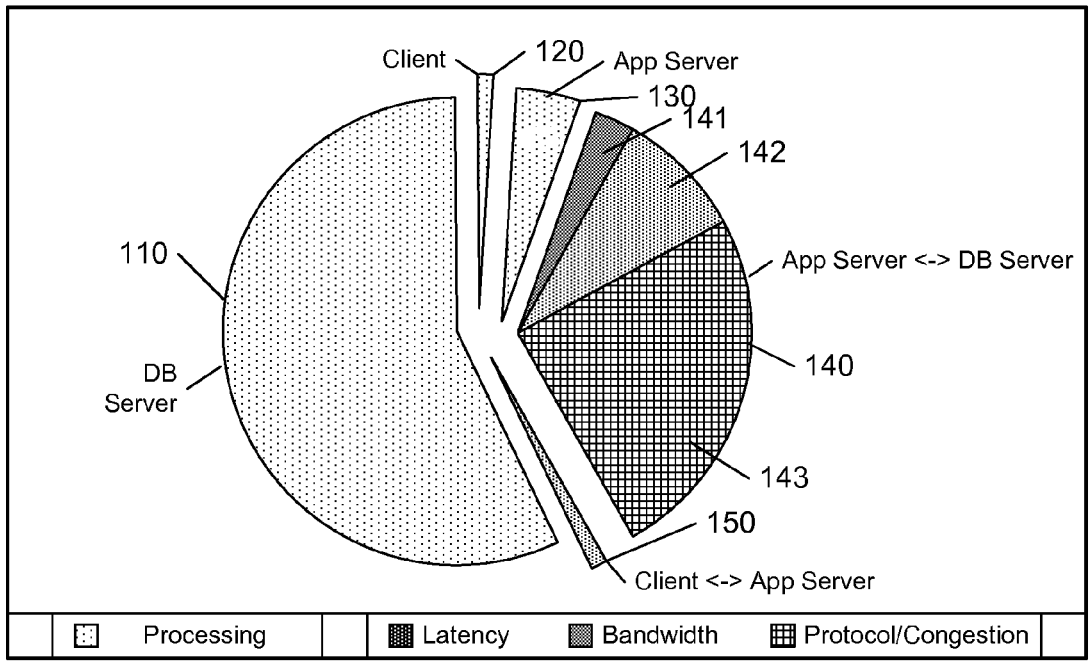
FIG. 1 [Prior Art]
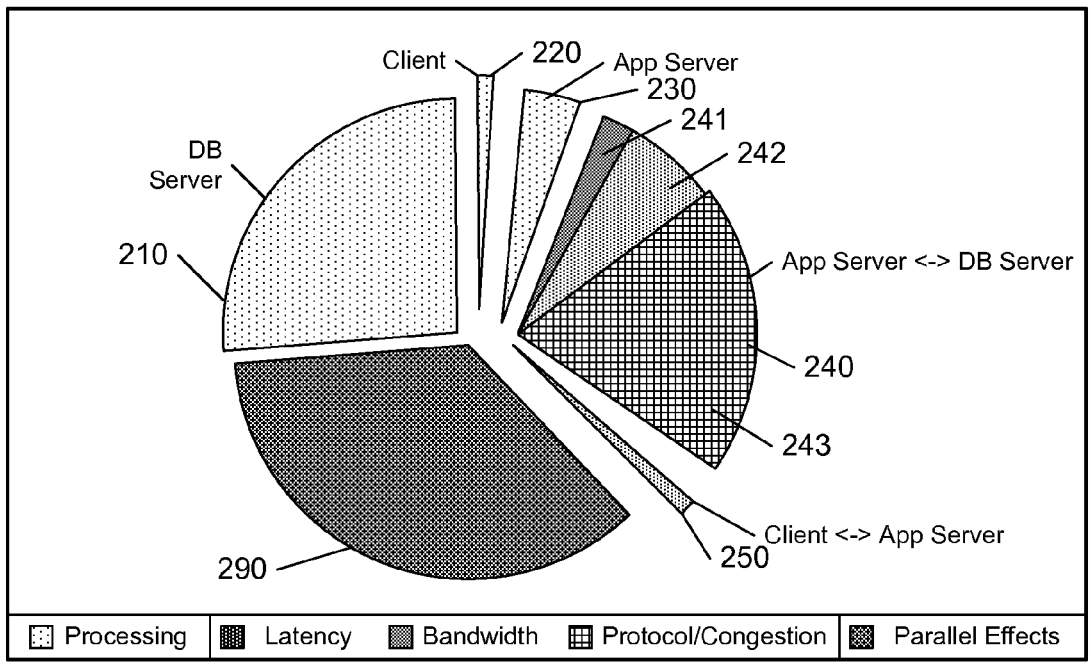
FIG. 2

NETWORK DELAY ANALYSIS INCLUDING PARALLEL DELAY EFFECTS

This application claims the benefit of U.S. Provisional Patent Application 60/916,842, filed 9 May 2007.

BACKGROUND AND SUMMARY OF THE INVENTION

This invention relates to the field of network analysis, and in particular to a system and method for analyzing and assessing the effects of parallel delays within an application.

Proper management of a network generally requires assuring that the network is performing satisfactorily for the users of the network, modifying the network to address performance issues or problems, and planning for future improvements to the network as demand increases and as newer technologies and alternatives become available.

A variety of tools have been developed, and continue to be developed, to facilitate the management of communication networks, and in particular for managing networks that provide communications among computer devices. Many of these tools are configured to model the network's performance under a variety of traffic conditions, both real and hypothesized, and in many cases, base this performance on data collected from the actual network.

One of the primary parameters for analyzing or assessing the performance of a network is the time it takes for messages to reliably reach their destination. This time is dependent upon a variety of factors. The message is typically partitioned into transmission elements, herein termed packets for convenience. Each packet must enter the network, and incurs a delay as it gains network access. When it enters the network, it incurs a delay that is dependent upon the bandwidth available at each link along its path to its destination. It may also incur queuing delays as it passes through intermediate nodes, particularly at congested links. Upon arrival at the receiving node, a delay may also be incurred as the proper receipt of the message is verified. Some of these factors are constant, while others vary over time, typically dependent on network loading.

The effectiveness of a network analysis system is based on a number of factors, one of which is the system's ability to distinguish the variety of causes of message delay, and another is the system's ability to assess the effect of potential network modifications on each of these classes of delay. A variety of tools have been developed to distinguish the causes of message delay, including, for example, the techniques disclosed in copending U.S. patent application Ser. No. 11/776,736, "NETWORK CONGESTION DELAY ANALYSIS", filed 12 Jul. 2007 for Steve Niemczyk, Patrick J. Malloy, Alain J. Cohen, and Russel Mark Elsner, and incorporated by reference herein. In this copending application, the various components of message delays are classified as bandwidth delay, propagation delay, protocol delay, congestion delay, and processing delay. By knowing the cause of the delays that a message incurs, potential solutions to reduce these delays can be determined. For example, if a significant portion of the delay is attributed to congestion delay, the node that is causing the 'bottleneck' can be identified, and the routing of messages may be modified to provide a more balanced distribution of traffic, with a corresponding reduction in the amount of traffic through the bottleneck node. In like manner, if a significant portion of the delay is attributed to bandwidth delay, additional channels between the nodes that are causing the bandwidth delay can be provided. In like manner, knowing the delay characteristics of a network provides opportunities for the developers of applications to optimize the applications by avoiding bottleneck paths, avoiding bursty traffic on bandwidth limited paths, and so on.

The use of conventional delay analysis and assessment techniques to identify potential improvements of performance, however, has significant limitations. Generally, the performance factors are not independent, such that an improvement in one delay factor is not necessarily reflected in the resultant delay. Conventional delay analysis techniques generally allocate/classify delays to the components in the 'critical path' of the message delay; that is, each component delay is determined by its direct effect on the overall message delay. Often, a reduction in one delay component merely reveals that another delay component that was not on the critical path is identified as being (another) major cause of the overall message delay. For example, if a particular communications link exhibits a significant bandwidth delay, the fact that there are delays caused by slow processing may be masked, particularly if a slow processor is providing data only slightly faster than the bandwidth-limited link can forward the data. Curing the bottleneck will not necessarily have a corresponding effect on the overall delay, because the data continues to be presented slowly, albeit into a wider bandwidth channel.

This lack of independence among delay components is particularly problematic for applications that employ parallelism. Consider, for example, an application that includes two tasks, one task that incurs a substantial processing delay, and another that incurs a substantial bandwidth delay. If these tasks are performed sequentially, the overall delay will correspond to the sum of these delays, and a reduction in either will be reflected in the overall delay. If these tasks are performed in parallel, however, the overall delay will correspond to the longer of the two delays, and a reduction in one of the delays will not necessarily affect the overall delay. Conventional delay analysis techniques that report the delays that are only on the critical path, and thus have a direct effect on the overall delay, provide little guidance as to the effect that a reduction of any delay component will have on the overall delay of an application that employs parallelism.

It should be noted that most network applications are affected by multiple delays on parallel paths, even if the application is not purposely designed to use parallelism. An event at one node may trigger, for example, parallel events on another node. Even though the application on the first node may be purely sequential, its response from the second node will be dependent upon the delays occurring on the parallel paths.

For ease of reference, the term 'component delay' is used herein to reference a delay in an application that can be eliminated by eliminating a single component, or type, of delay, and 'parallel delay' is used herein to refer to a delay in an application that can only be eliminated by two or more components of delay.

It would be advantageous to provide a method and system that identify parallel delays. It would also be advantageous to provide a method and system that facilitate the analysis of parallel delays. It would also be advantageous to provide a method and system that facilitate the identification of improvements that can be achieved by reducing one or more delay components within a network or within an application.

These advantages, and others, can be realized by a method and system that facilitate the analysis and assessment of application delays, including parallel delays. A trace file of an application's network events is processed to categorize the causes of delays incurred in the propagation and processing of these events. The system identifies the amount of delay ('component delay') that can be eliminated by eliminating each of the components of delay individually, as well as the amount of delay ('parallel delay') that can be eliminated by eliminating combinations of the delay components. A user interface displays the amount of reduction that can be achieved by eliminating each component delay individually and the amount of reduction that can be achieved by eliminating combinations of the individual component delays. To facilitate the analysis and assessment of these parallel delays, the interface allows the user to 'drill down' to view the individual delay components contained in each combination forming the parallel delays. In this manner, the user is provided a view of each of the delay components that would need to be addressed, either individually or in combination, to improve the overall application delay.

BRIEF DESCRIPTION OF THE DRAWINGS

The invention is explained in further detail, and by way of example, with reference to the accompanying drawings wherein:

FIG. 1 illustrates an example display of a prior art delay analysis system.

FIGS. 2 and 4 illustrate example displays of a delay analysis system in accordance with this invention.

Throughout the drawings, the same reference numerals indicate similar or corresponding features or functions. The drawings are included for illustrative purposes and are not intended to limit the scope of the invention.

DETAILED DESCRIPTION

Figure 3:
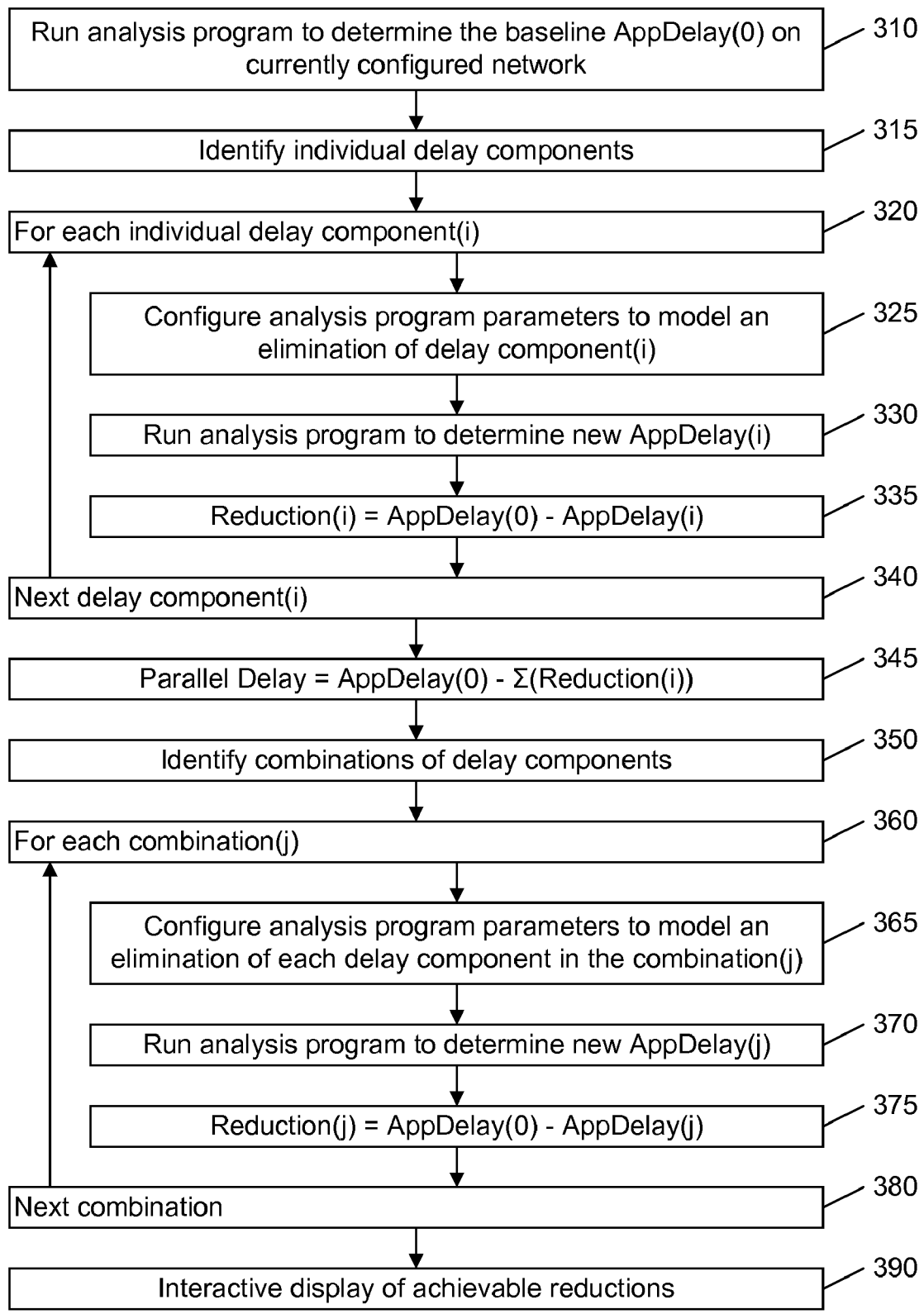
FIG. 3 illustrates an example flow diagram of a delay analysis system in accordance with this invention.

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

FIG. 1 illustrates an example display of a prior art network timing analysis system, as presented in copending U.S. patent application Ser. No. 11/397,359, "APPLICATION DELAY ANALYSIS", filed 4 Apr. 2006 for Russell Mark Elsner, John Wilson Strohm, and Michael S. Canney, and incorporated by reference herein.

The timing analysis diagram of FIG. 1 presents summary statistics related to the source of delays in a segmented/exploded pie-chart format, each source herein termed a 'delay component'. Typically, a distinction is made between the delay that is related to the processing of the message ('processing component'), such as the delay incurred between the time that a message is received and the time that a response to the message is produced, and component delays that are related to the transmission of the message, including each of the components of delay encountered as the message travels from its source to its destination, such as a bandwidth component, a latency component, a congestion component, and so on.

The network traversal delay generally includes a variety of components:

Latency/Propagation time: the delay incurred for a bit of a message to travel from the source to the destination, generally determined by the distance between the source and destination, the speed of light/electromagnetic propagation, and the minimum forwarding time at each transfer point along the path.

Bandwidth/Transit time: the delay incurred for all of the bits of the message to be transmitted and received, generally determined by the minimum bandwidth along the path of the message and the number of bits in the message.

Congestion/Protocol time: the delay incurred to gain access to the channel to effect the transmission, generally determined by the difference between the time that the message was ready for transmission and the time that it was actually transmitted, including retransmissions.

Optionally, the system may be configured to distinguish between protocol delay and congestion delay, and, optionally, may distinguish 'self-congestion' delay caused by other packets from the same application. Generally, the protocol delay includes the overhead associated with conforming to a protocol, such as waiting for an acknowledgement of a prior packet before sending a next packet, and so on, whereas congestion delay includes the delays incurred when the message competes with other messages for network resources.

In the example of FIG. 1, messages are generated, processed, and propagated among a client, an application server, and a database server, corresponding, for example, to an application wherein a user at a client device interacts with a server to request information, and the server obtains data from a database server to satisfy this request.

FIG. 1 illustrates the accumulated tier processing delay 110, 120, 130 for each of the example tiers/nodes (DB Server, Client, and App Server) in the example application, and the network traversal delay 140, 150 for each of the active links (the App Server—DB Server link 140, and the Client—App Server link 150). In this example, the processing at the DB Server delay 110 accounts for about 58% of the total accumulated delay, while the network traversal delay 140 between the App Server and the DB Server accounts for about 38% of the total delay.

In a preferred embodiment of a network analysis system, the components of each of the network traversal delays are preferably displayed, so that a network administrator and/or application developer can address the different causes of delay to effect an improvement. The network traversal delay 140 between the App Server and the DB Server is illustrated as comprising a latency delay 141, a bandwidth delay 142, and a protocol/congestion delay 143. The network traversal delay 150 between the Client and App Server comprises primarily bandwidth delay, the other components being substantially negligible.

The display of FIG. 1 indicates that the performance of the application can be improved in a number of ways. It would appear, for example, that eliminating the processing delay 110 at the DB Server will substantially reduce the overall accumulated delay. In like manner, eliminating the bandwidth 142 or protocol/congestion delay 143 would appear to provide a substantial reduction in the overall accumulated delay. Such an interpretation, however, assumes that each of the delays is substantially independent and/or that the delays are strictly sequential. Such an assumption, however, is rarely valid in a typical network environment.

Consider, for example, an environment wherein FIG. 1 corresponds to the delays experienced by an application that is structured to transfer data from the DB Server in parallel, at least in part, with the processing at the DB Server. That is, instead of waiting for the request for data to be entirely processed at the DB Server before the data is transmitted, the application is structured to provide data as it becomes available from the DB Server, such that some of the data is being transmitted at the same time that other data is being generated at the DB Server.

Consider now a possible effect of improving the processing time at the DB Server; such as increasing the rate at which the DB Server is able to provide the data to the network. If the network is currently underutilized, such that there is excess bandwidth available, increasing the rate at which the data is provided to the network will have a direct effect on the overall delay time of the example application. If, however, the link between the DB Server and App Server is currently at or near its maximum bandwidth capability, increasing the rate that the DB Server is able to provide the data will not necessarily produce a corresponding reduction in the overall delay, because the data will merely have to wait in queues before the bandwidth-constrained link is able to accept the data. That is, most or all of the reduction in processing delay at the DB Server will merely be offset by a corresponding increase in congestion delay across the DB Server—App Server link. That is, in such an environment, although the processing delay component 110 of FIG. 1 would decrease, the protocol/congestion delay component 143 would increase, and the effect on the overall delay would be significantly less than the effect implied by the conventional display of FIG. 1. In like manner, reducing the bandwidth delay 142 may have little effect on the overall delay if a significant amount of the bandwidth delay is being incurred in parallel with the processing delay 110.

This simple example serves to demonstrate that although the processing delay at the DB Server is illustrated as contributing 58% of the overall delay using the conventional delay analysis display of FIG. 1, the elimination of the processing delay at the DP Server will not necessarily reduce the overall delay by 58%, because the amount of reduction in overall delay that is achievable is dependent upon other factors, such link utilization and others. In general, the conventional display of FIG. 1 provides a minimal amount of information regarding the amount of actual delay reduction that can be achieved by eliminating any of the illustrated delay components.

In accordance with an aspect of this invention, the system is configured to directly identify the reduction in overall delay that can be achieved by the elimination of delay components. In a preferred embodiment of this invention, the system identifies the portions of the overall application delay that can be reduced by addressing each delay component individually and the portion of the overall application that can only be reduced by addressing multiple delay components. That is, the paradigm for presenting the information to the user is changed from the conventional identification of the contribution of each delay component to the overall delay to an identification of the reduction in the overall delay that can be achieved by eliminating each delay component, and each combination of delay components. Optionally, the system distinguishes between component delays that can be directly affected by a particular user's action, such as bandwidth and processing delay that can be reduced by providing higher-performance equipment, and component delays that cannot be directly affected by the particular user, such as latency and congestion delays, thereby further focusing the analysis on reductions in the application delay that can be achieved by the user.

FIG. 2 illustrates an example display of achievable delay reduction, using the same example application that was used in FIG. 1. As contrast to the 58% segment 110 of overall delay being attributed to processing delay at the DB Server illustrated in FIG. 1, with no indication of the savings achievable by addressing this processing delay, FIG. 2 illustrates at segment 210 that the elimination of the processing delay at the DB Server will reduce the overall delay by approximately 26%. Each of the other segments 220, 230, 240 (241-243), and 250 illustrates the amount of delay reduction that can be achieved by eliminating each of these delay components. A new segment 290 identifies an amount of parallel delay, which indicates that approximately 36% of the overall delay cannot be reduced without addressing multiple delay components.

Any number of techniques can be used to determine/estimate the amount of delay that is reduced by eliminating each delay component. A variety of network analysis programs, for example, allow users to perform "what-if" analyses. In a preferred embodiment of this invention, a controller is configured to exercise such a network analysis program for each hypothesized elimination of delay.

FIG. 3 illustrates an example flow diagram for determining the amount of delay reduction that is achievable for each delay component and combination of delay components.

At 310, the selected analysis program is run to determine the application delay on the network as currently configured. This application delay forms a measure from which the achievable reductions are determined. In an example embodiment of this invention, the delay analysis system as described in the above referenced copending U.S. patent application Ser. No. 11/776,736, "NETWORK CONGESTION DELAY ANALYSIS" is used to process a trace file of events that occur on the network during the execution of the application to determine the delays incurred by the application in the network as currently configured. Optionally, the delay measure can be defined as the application delay that remains after eliminating the component delays that are uncontrollable/unaffectable by the particular user. For ease of reference, the term 'application delay' as used herein refers to a delay measure that is used as a reference for assessing an amount of delay that can be reduced from this measure by addressing one or more delay components.

At 315, the individual delay components that are to be assessed are identified. Generally, the particular delay components will be determined based on the available delay analysis system. In the example delay analysis system, the identified delay components include the processing delay at each tier of the network (e.g. client, server, and database processing delays), and the bandwidth, latency, protocol, and congestion delays across each link of the network (e.g. client-server and server-database links), although for ease of illustration a single protocol/congestion delay component is used. That is, the selection of display components need not correspond directly to the delay components of the analysis system, provided that the selected delay components can be controlled/eliminated using the components of the given analysis system. For example, a user may select from the individual delay components identified in the analysis program based on the components that are within the direct control of the user, and lump all other delay components as a single "other" component for subsequent assessment. For example, the typical delay-related elements that can be directly affected by a network administrator are the processing delays at select nodes, and the bandwidth delays at select links; each of the other delay components that may be identified in the analysis program may be identified as a single 'beyond control' component for assessment in this process.

The loop 320-340 exercises the given delay analysis program for each of the delay components under the what-if condition: "What if this delay component could be eliminated?"

At 325, the parameters of the delay analysis program are appropriately configured to effect the hypothesized elimination of the given delay component. In the example delay analysis program, this elimination is effected by merely asserting that the value of the given delay component is zero. In other conventional delay analysis systems, a different set of parameters may be required to be set to particular values to effect an elimination of the given delay component. For example, in a flow analysis system, the bandwidth of a link may need to be set to a virtually infinite value to provide an elimination of the bandwidth delay of that link. Similarly, a distance between nodes may need to be set to zero to provide an elimination of latency delay, and so on.

At 330, the analysis program is executed using the hypothesized elimination of the given delay component to determine the application delay time that could be achieved if this delay component were eliminated from the application and/or network.

It is significant to note that, as discussed above, this determination of the resultant delay is not merely a subtraction of the conventionally identified amount of delay attributed to the particular delay component, due to parallel effects. If each event of the application occurs in a strictly sequential path, the resultant delay can be determined by subtracting the individual component delay, but few, if any, applications are purely sequential.

Conceptually, a conventional delay analysis program attributes the portions of delay caused by each delay component based on that component's presence on the critical-path of the delays causing the overall delay of the application. In an application with parallel treads, the elimination of a delay component will often produce a new critical-path, and the resultant application delay will be the delay caused by the remaining delays along this new critical-path.

In the example delay analysis program, the new critical path is determined by eliminating the given component delay along each parallel path, and then applying networking-related constraints and/or assumptions to determine the resultant delay, as detailed in the above reference copending U.S. patent application Ser. No. 11/776,736, incorporated by reference herein. For example, if the elimination of a delay component along a path introduces a conflict for available network resources with another path, a congestion-delay component is assumed to occur in one of the paths to offset the concurrent demand for the resource.

Having determined the resultant delay under the hypothesized elimination of the given delay component, the achievable reduction in the application delay time is determined by the difference between the application delay on the network as currently configured and this resultant delay on the network with a hypothesized elimination of the delay component, at 340.

This achievable reduction for each delay component is used as the basis for the display of delay components in FIG. 2. That is, each delay component segment in FIG. 2 corresponds to the reduction determined for that component's elimination at 340. In FIG. 2, the segments illustrating the achievable reduction correspond to a percentage of the total application delay, although other forms of representation may be used, as detailed further below.

The amount of parallel delay, i.e. the delay that can only be reduced by addressing multiple delay components, is determined as the delay that remains after accounting for the delays that can be reduced by addressing/eliminating the delay components individually, at 345. In FIG. 2, for example, the sum of each achievable-reduction-segment 210, 220, 230, 241, 242, 243, 250 of individual delay components amounts to approximately 64%, leaving 36% of the total application delay that cannot be reduced by addressing any of the delay components individually, as illustrated by the parallel delay component 290.

In a preferred embodiment of this invention, particular combinations of delay components contributing to the overall parallel delay component can be assessed to determine the reduction in application delay that can be achieved by addressing each combination. That is, a user may be interested in determining the reduction that could be achieved if the processing delay at both the client and server are addressed, or the reduction that could be achieved if both the bandwidth delay on the link between the server and database and the processing delay at the database server are addressed, and so on.

At 350 of FIG. 3, the particular combinations of delay components that are to be assessed are identified. The number of possible combinations is dependent upon the number of individual delay components. In the current example, there are three processing delay components (client, server, database processing) and six link-related delay components (latency, bandwidth, and protocol/congestion at each of the two links (client-server, server-database)), which would amount to over a thousand possible combinations of two or more of these ten individual delay components.

Preferably, a default set of combinations are defined, and the user is provided a variety of options for making alternative selections of the combinations to be assessed. The user may, for example, explicitly define each combination (e.g. client-server-bandwidth and server-processing; server-processing and client-processing; and so on). Or, the user may define a selection rule, such as 'all two-component combinations', 'all two- or three-component combinations that include client-server-bandwidth', 'all combinations that do not include the "beyond control" delay component', and so on). A preferred user interface for this selection includes the ability to define the selection and/or the rules by selecting items on a graphic display, such as icons for each delay component and for common operations, such as 'and', 'or', 'not', 'fewer than', 'more than', and so on. Common selection options, such as 'all n-component combinations' can be defined wherein the user need only specify the desired "n" (e.g. "3" for selecting 'all 3-component combinations').

The loop 360-380 assesses each selected combination of component delays, using the same techniques as discussed above with respect to the loop 320-340. At 365, the appropriate parameters of the delay analysis system are set to effect an elimination of each delay component in the given combination, such as, in the above reference example, the elimination of both the client-server-bandwidth delay and the server-processing delay. At 370, the analysis program determines the resultant delay under the hypothesized multiple delay component eliminations, and at 375, the achieved reduction by this combined elimination is determined.

One of skill in the art will recognize that the selection of combinations and subsequent determination of the reduction achievable by eliminating all of the delay components in each combination need not occur as a loop that processes each of a set of defined combinations. In a preferred embodiment, the user is continually provided the opportunity to define a particular combination and request a determination of the achievable reduction by that combination, either explicitly or implicitly. For example, if the user selects a displayed link, each of the two-component combinations that include this link may be assessed for subsequent display. Similarly, the user is provided the opportunity to refine a currently selected combination by adding or removing delay components from the combination, thereby facilitating progressive analyses.

As noted above, the display of FIG. 2 an identification of the amount of application delay that can be reduced by the elimination of each of the individual delay components. Alternatively viewed, the display of FIG. 2 provides an indication of the delay components whose reduction is likely to provide a reduction in the overall delay.

In like manner, an alternative interpretation of the parallel delay 290 is an indication of the efficiencies provided by the parallelism of the application/network. That is, the parallel delay 290 likely identifies proportions of time that are being efficiently utilized by including multiple concurrent delay components. As noted above, if the example application is structured to transmit data from the DB Server to the App Server while the DB Server continues to process the request for the data, some of the transmission delay that would have occurred at the end of processing the data at the DB Server will occur concurrent with the processing of the data at the DB Server. That is, if the delays were not occurring on parallel paths, the overall delay would likely be substantially larger, and thus parallel delays are generally indicative of a reduction of the delay that might have occurred if these parallel delays were not present. That is, one could alternatively use the provided analysis to optimize efficiency by maximizing the proportion of parallel delay. In like manner, the occurrence of a parallel delay of a combination of a large number of individual components can often be viewed as a highly efficient occurrence of multiple concurrent delays.

In a preferred embodiment of this invention, the display of the components of an application's delay is interactive, allowing the user to obtain alternative views to facilitate the analysis of the achievable reduction in application delays.

As noted above, the various components of delay can be identified to different levels of detail. The example protocol/congestion delay category in FIGS. 1 and 2, for example, may be partitioned into a protocol delay category and a congestion delay category. The protocol delay category can be further partitioned into sub-categories of delay such as delays caused by Retransmissions, Out of Sequence Packets, TCP-specific effects (In-Flight Data, Nagle's Delay, etc.), and so on. In like manner, the congestion delay category can be similarly further partitioned.

In addition to partitioning delays into components based on the type of delay that is occurring, certain events or processes exhibit characteristic patterns of delays, and the delays attributable to such events or processes can be distinguished as individual delay components. For example, each of the characteristic delays associated with the "ftp downloads" during an application can be categorized as individual delay components, to facilitate an analysis of the effect of reducing such ftp-related delay components.

In accordance with an aspect of this invention, the user is provided the option of 'drilling down' into each displayed delay component to view statistics related to the variety of sub-categories within each category. These statistics may be presented in a variety of forms, including, for example, plots, bar-graphs, tables, and so on. As is common in the art, the user preferably drills-down to lower levels of detail by 'double-clicking' on the display of the delay component of interest. For example, double-clicking on the parallel delay segment 290 of FIG. 2 may provide a display of the reduction provided by each 2-component combination and the remainder reduction provided by the 'greater-than-2' component combinations. Double-clicking on the 'greater-than-2' segment may provide a display of the reduction provided by each 3-component combination and the remainder reduction provided by the 'greater-than-3' component combinations. Or, for example, double-clicking on the parallel delay segment 290 may provide a partitioning of the segment 290 into the reduction achievable by each set of combinations (all 2-component combinations, all 3-component combinations, all 4-component combinations, and so on).

Figure 4:
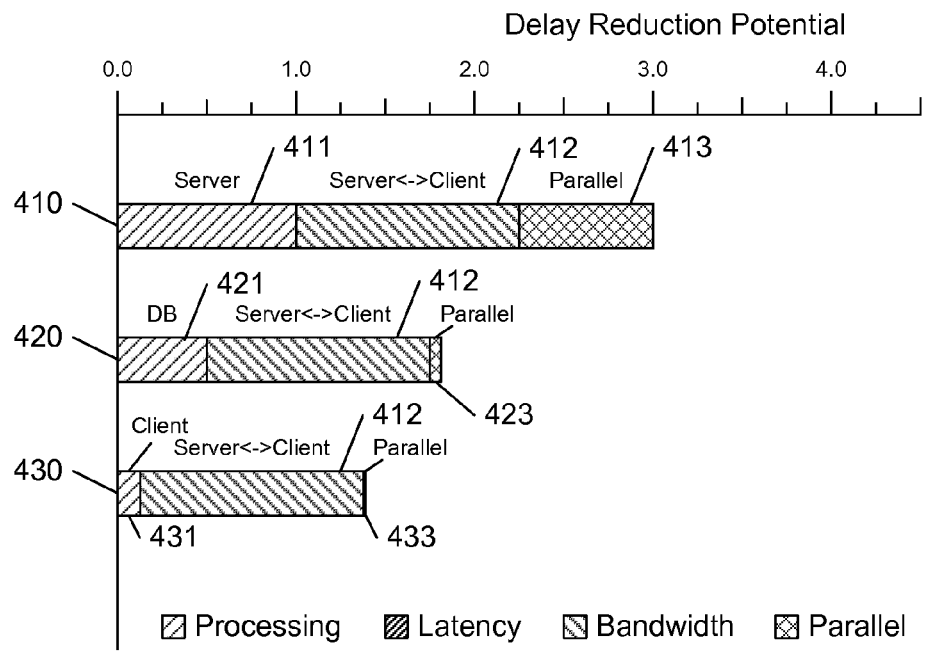

FIG. 4 illustrates an example display of achievable delay reductions in a bar-chart format. In a preferred embodiment of this invention, the user is provided the option of partitioning/grouping the delays to present different views of the delays to facilitate analysis and/or trouble-shooting.

In this example, the delays associated with a client-server-database application are illustrated in three bar graphs 410, 411, and 412 relative to the processing delay at each tier and the bandwidth delay of the client-server link. Such a display may be provided, for example, in response to the user selecting the client-server bandwidth delay as a first parameter of the display presentation, and processing delays as a second parameter.

The first bar 410 illustrates that 1.0 seconds 411 of application delay can be reduced by eliminating the server processing delay; 1.25 seconds 412 can be reduced by eliminating the server-client bandwidth delay; and an additional 0.75 seconds 413 can be reduced by eliminating both the server processing delay and the server-client bandwidth delay.

The second bar 420 illustrates the same 1.25 second reduction 412 by eliminating the server-client bandwidth delay, a 0.5 second reduction 421 by eliminating the database processing delay, and an additional 0.1 second reduction 423 by eliminating both the database processing delay and the server-client bandwidth delay.

The third bar 430 illustrates the same 1.25 second reduction 412 by eliminating the server-client bandwidth delay, a 0.2 second reduction 431 by eliminating the client processing delay, and a minimal additional reduction 433 by eliminating both the client processing delay and the server-client bandwidth delay.

Figure 5:
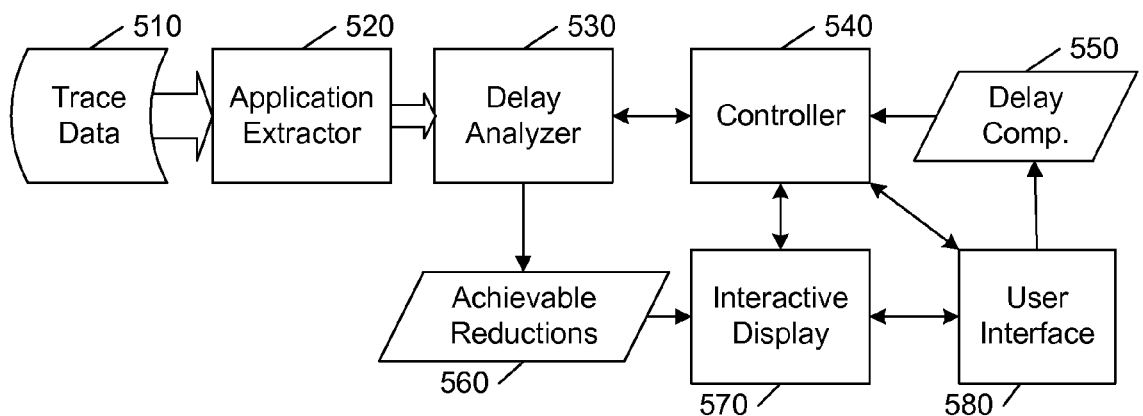
FIG. 5 illustrates an example block diagram of a timing analysis system in accordance with this invention.

FIG. 5 illustrates an example block diagram of a timing analysis system for embodying this invention. One of skill in the art will recognize that different processes and structures may be used to provide the desired determination and presentation of achievable application delay reductions based on the elimination of each delay component individually and the elimination of sets of multiple delay components.

An application extractor 520 extracts messages and events related to the application being analyzed from trace data 510 to create a sequence of application messages/events. This trace data 510 is generally stored data, although it could be 'live' data from trace devices, such as one or more network 'sniffers' that monitor traffic on a network. Optionally, this timing analysis system may be coupled to a network simulator that models network behavior, and the trace data 510 may reflect simulated messages and events.

A controller 540 enables a delay analyzer 530 to perform a delay analysis of the application-specific events identified by the application extractor 520 to determine an application delay under current application/network conditions. As noted above, the determined application delay may only include select delay components that are controllable by the particular user.

The controller 540 subsequently receives a set of select delay components 540 for assessment. These delay components 540 may be the same components as used in the delay analyzer 530, or components that can be derived from or can control the delay components of the delay analyzer 530, as discussed above.

The controller 540 controls the delay analyzer 530 to determine the effect of an elimination of each of the individual delay components 550, preferably in the form of an identification of the reduction from the application delay that is provided by the sole elimination of each individual delay component. From the application delay and these determined reductions, the remainder reduction that can only be achieved by the elimination of multiple delay components is determined and identified as a composite parallel delay.

The determined reductions 560, including the reductions achievable by addressing multiple component delays (parallel delays) are preferably presented to the user via an interactive display 570, and accessed via a user interface 580.

Optionally, the system embodying this invention also allows a user to define/select combinations of delay components 550, as discussed above, based on which the controller 540 adjusts the parameters of delay analyzer 530 to effect the elimination of all of the delay components within each selected combination. The delay analyzer 530 consequently determines that reduction in application delay 560 that can be achieved by eliminating all of the delay components of each combination. The user interface 580 allows the user to view the determined delay reductions for each individual delay component and any or all of the selected combinations of these delay components, as well as allowing the user to identify other combinations 550 for assessment by the delay analyzer 530.

The interactive display 570 is configured to interact with the user interface 580 to provide a display of the reductions of application delay that can be achieved by addressing each of the individual delay components, as well as the sets of selected combinations of the various delay components, as discussed above.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the timing analysis system is presented for assessing the delays of a single application, one of skill in the art will recognize that the 'application' being analyzed may include multiple applications, to assess the parallel delays while multiple applications are run, or select parts of a single application, to assess the parallel delays that occur at these select parts. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A method comprising:
   determining, at a network analysis system, an application delay of an application on a network,
   identifying, by the network analysis system, two or more delay components associated with the application delay,
   determining, by the network analysis system, each of a plurality of first reductions of the application delay corresponding to a substantial elimination of each delay component of a plurality of the delay components, and
   determining, by the network analysis system, one or more second reductions of the application delay that can only be achieved by a change to two or more of the delay components.

2. The method of claim 1, including displaying one or more of the plurality of first reductions and the one or more second reductions.

3. The method of claim 2, including: receiving a user selection of a displayed first or second reduction, and providing additional information based on the user selection.

4. The method of claim 2, wherein the display includes pie-chart segments corresponding to each of the plurality of first reductions and a remainder segment corresponding to the one or more second reductions.

5. The method of claim 2, wherein the display includes an illustration of the first reduction corresponding to the substantial elimination of each of a combination of delay components, and an illustration of one of the one or more second reductions corresponding to the combination.

6. The method of claim 5, including receiving a user selection of the combination.

7. The method of claim 5, including: receiving a user selection of a displayed first or second reduction, and providing additional information based on the user selection.

8. The method of claim 1, wherein the determining of the one or more second reductions includes determining a reduction corresponding to at least one combination of delay components of the plurality of delay components.

9. The method of claim 8, including receiving a user selection of the at least one combination.

10. The method of claim 1, wherein:
    determining the application delay includes executing a delay analysis program based on a first set of parameters, and
    determining each of the plurality of first reductions includes:
      setting one or more of the parameters of the delay analysis program to effect the substantial elimination of the corresponding delay component,
      executing the delay analysis program to determine a resultant delay, and
      determining the first reduction by subtracting the resultant delay from the application delay.

11. The method of claim 10, wherein the delay analysis program determines the resultant delay based on a critical path analysis.

12. The method of claim 1, wherein the plurality of delay components includes at least a bandwidth delay and a processing delay.

13. The method of claim 1, including: extracting events from trace data corresponding to an execution of the application on the network, and determining the application delay based on the events.

14. A system comprising:
a delay analyzer, and
a controller that:
  controls the delay analyzer to determine an application delay of an application on a network,
  identifies one or more delay components associated with the application delay,
  controls the delay analyzer to determine each of a plurality of first reductions of the application delay corresponding to a substantial elimination of each delay component of a plurality of the delay components, and
  determines one or more second reductions of the application delay that can only be achieved by a change to two or more of the delay components.

15. The system of claim 14, including a display device that is controlled by the controller to provide a display of one or more of the plurality of first reductions and the one or more second reductions.

16. The system of claim 15, wherein the controller is configured to: receive a user selection of a displayed first or second reduction, and provide a display of additional information based on the user selection.

17. The system of claim 15, wherein the display includes pie-chart segments corresponding to each of the plurality of first reductions and a remainder segment corresponding to the one or second reductions.

18. The system of claim 15, wherein the display includes an illustration of the first reduction corresponding to a substantial elimination of each of a combination of delay components, and an illustration of one of the one or more second reductions corresponding to the combination.

19. The system of claim 18, wherein the controller is configured to receive a user selection of the combination.

20. The system of claim 18, wherein the controller is configured to: receive a user selection of a displayed first or second reduction, and provide a display of additional information based on the user selection.

21. The system of claim 14, wherein the controller is configured to determine at least one of the one or more second reductions by controlling the delay analyzer to determine a reduction that is achievable by a substantial elimination of at least one combination of delay components of the plurality of delay components.

22. The system of claim 21, wherein the controller is configured to receive a user selection of the at least one combination.

23. The system of claim 22, wherein the controller is configured to determine each of the plurality of first reductions of the application delay by: setting one or more parameters of the delay analysis program to effect the substantial elimination of the corresponding delay component, executing the delay analysis program to determine a resultant delay, and subtracting the resultant delay from the application delay.

24. The system of claim 14, wherein the delay analysis program determines the resultant delay based on a critical path analysis.

25. The system of claim 14, wherein the plurality of delay components includes at least a bandwidth delay and a processing delay.

26. The system of claim 14, including an extractor that is configured to extract events from trace data corresponding to an execution of the application on the network, and wherein the delay analyzer is configured to determine the application delay based on the events.

27. A non-transitory computer readable medium that includes a computer program that is configured to cause a processor to:
  determine an application delay of an application on a network,
  identify of two or more delay components associated with the application delay,
  determine each of a plurality of first reductions of the application delay corresponding to a substantial elimination of each delay component of a plurality of delay components,
  determine one or more second reductions of the application delay that can only be achieved by a change to two or more of the delay components, and
  provide a display one or more of the plurality of reductions and the one or more second reductions.

28. The computer readable medium of claim 27, wherein the computer program is configured to cause the processor to: receive a user selection of a displayed first or second reduction, and provide a display of additional information based on the user selection.

29. The computer readable medium of claim 27, wherein the display includes pie-chart segments corresponding to each of the plurality of first reductions and a remainder segment corresponding to the one or more second reductions.

30. The computer readable medium of claim 27, wherein the computer program is configured to cause the processor to:
  determine the application delay by causing execution of a delay analysis program based on a first set of parameters, and
  determine each of the plurality of first reductions by:
    setting one or more of the parameters of the delay analysis program to effect the substantial elimination of the corresponding delay component,
    causing execution of the delay analysis program to determine a resultant delay, and
    subtracting the resultant delay from the application delay.

* * * * *